United States Patent [19]

Beardsley et al.

[11] 3,948,042

[45] Apr. 6, 1976

[54] SYSTEM FOR CONTROLLING THE NOZZLE THROAT AREA OF A ROCKET MOTOR

[75] Inventors: James D. Beardsley, Ridgeley, W. Va.; John D. Shipley, Orlando, Fla.

[73] Assignee: The United States of America as represented by the Secretary of the Navy, Washington, D.C.

[22] Filed: Dec. 23, 1968

[21] Appl. No.: 788,990

[52] U.S. Cl. .............................................. 60/242
[51] Int. Cl.² ......................................... F02K 1/18
[58] Field of Search .............................. 60/242, 254

[56] References Cited
UNITED STATES PATENTS

| | | |
|---|---|---|
| 2,566,961 | 9/1951 | Poole ................................... 60/242 |
| 2,750,734 | 6/1956 | Anxionnaz et al. ................... 60/238 |
| 2,820,340 | 1/1958 | Dolza et al. .......................... 60/238 |
| 3,059,425 | 10/1962 | McSherry et al. ................... 60/242 |
| 3,073,112 | 1/1963 | Bleikamp, Jr. ....................... 60/242 |

*Primary Examiner*—Samuel Feinberg
*Attorney, Agent, or Firm*—Richard S. Sciascia; Joseph M. St.Amand; Howard J. Murray, Jr.

[57] ABSTRACT

A system for controlling the annular nozzle throat area (and hence the thrust) of a solid-propellant rocket by means of a pintle or plug the position of which is caused to vary in response to pressure variations within the combustion chamber of the rocket.

2 Claims, 3 Drawing Figures

INVENTORS
JAMES D. BEARDSLEY
JOHN D. SHIPLEY

SYSTEM FOR CONTROLLING THE NOZZLE THROAT AREA OF A ROCKET MOTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

High-performance rockets with solid-propellant motors may have their flexibility enhanced by providing them with thrust modulation and multiple start-stop capabilities. However, these characteristics are not obtainable with conventional fixed-nozzle designs. It has consequently been suggested that means be provided whereby the nozzle area may be varied during flight in accordance with the particular mode of rocket operation desired. Efforts to achieve results have not heretofore been successful due to an unpredictably uneven erosion of the material of which the nozzle is composed as well as to the uncertainties of combustion chamber dynamics.

SUMMARY OF THE INVENTION

In the system herein disclosed, a variable area rocket motor nozzle is electrohydraulically controlled. Potential variations in combustion chamber pressure due to nozzle erosion and/or ballistic instabilities are continuously compensated for by causing the size of the nozzle opening to become a function of chamber pressure. In a preferred embodiment, an electrical signal is developed indicative of pressure conditions within the chamber, and this signal is fed back to a hydraulic control system to cause the position of the nozzle pintle or plug to become a function of signal amplitude. A further signal representative of instantaneous pintle position is correlated with the pressure feed-back variation to preclude overshoot and also to introduce a "stiffness" factor which effectively dampens any oscillations which might otherwise have a tendency to develop due to rapid changes in control signal amplitude.

STATMENT OF THE OBJECTS OF THE INVENTION

One object of the present invention, therefore, is to provide a variable-area nozzle for a solid-propellant rocket motor.

A further object of the present invention is to provide a nozzle for a solid-propellant rocket motor, the area of the nozzle being caused to vary in response to variations in combustion chamber pressure.

An additional object of the present invention is to provide means for electrohydraulically controlling the position of a rocket motor nozzle pintle by feeding back to a hydraulic pintle control system an electrical signal indicative of the instantaneous pressure in the combustion chamber of the rocket.

Other objects, advantages, and novel features of the invention will become apparent from the following detailed description of the invention when considered in conjunction with the accompanying drawings.

DESCRIPTION OF THE PREFERRED EMBODIMENT

Figure 1:
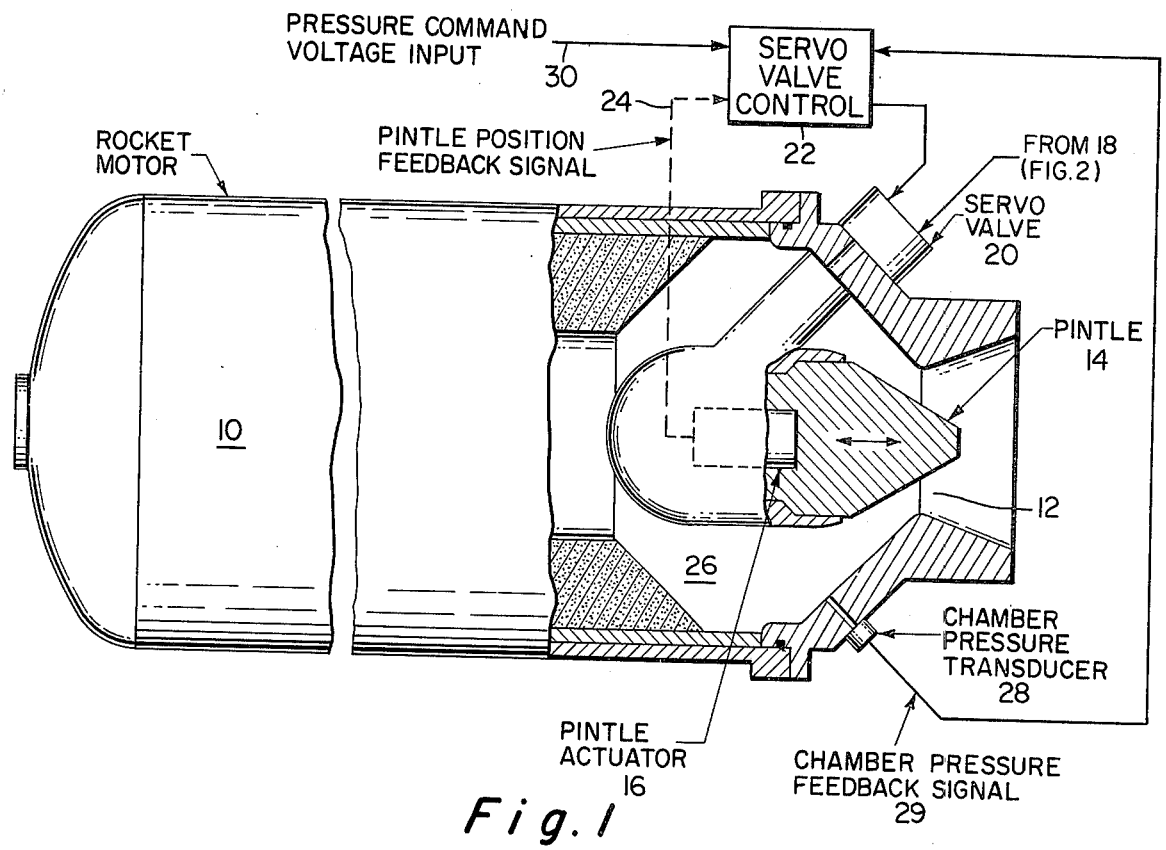
FIG. 1 is a partly sectional view of a solid-propellant rocket incorporating a variable throat area nozzle designed in accordance with a preferred embodiment of the present invention.

Referring now to the drawings, there is shown in FIG. 1 a rocket motor 10 of the solid-propellant type incorporating a variable throat-area nozzle 12 designed in accordance with a preferred embodiment of the present invention. Variations in the throat area of the nozzle 12 are brought about by axial movement of a pintle 14 as indicated by the arrows, this movement being effected by energization of a pintle acutator 16. The latter may be of any suitable type which can be operated by pressurized hydraulic fluid supplied thereto from a source 18 (shown in FIG. 2) through a servo valve 20.

The servo valve 20 is controlled by a unit 22 to be described in connection with a discussion of the system of FIG. 2. A signal representative of the instantaneous position of the pintle 14 is supplied to unit 22 by a mechanical linkage 24 connected to the actuator 16, as illustrated.

Pressure in the combustion chamber 26 of the rocket motor 10 is sensed by a transducer 28 and applied as an electrical signal 29 to the unit 22, together with a further signal 30 representing the pressure desired in such chamber at successive time periods during motor operation.

Figure 2:
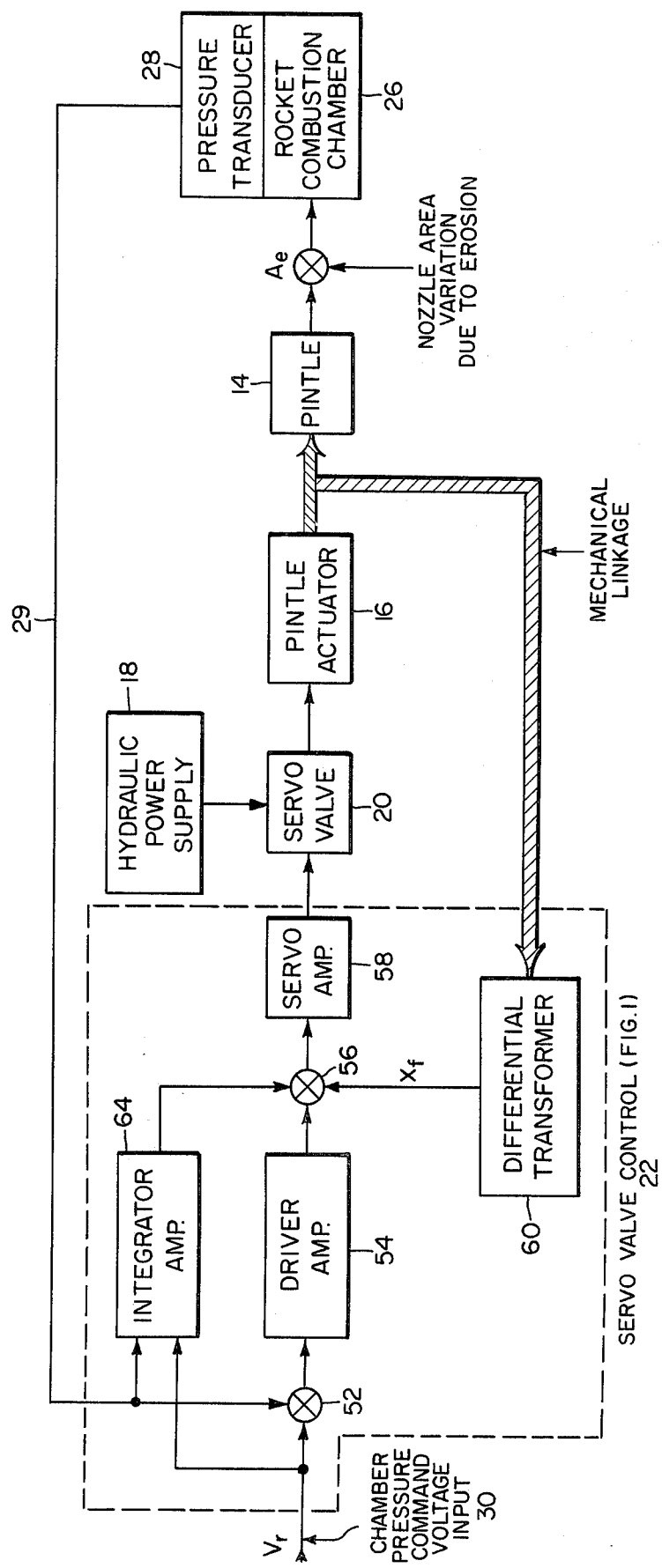
FIG. 2 is a block diagram of one form of electrohydraulic system in accordance with the present invention for controlling the position of the nozzle pintle of FIG. 1 as a function of variations in pressure in the rocket combustion chamber.

In FIG. 2 of the drawings is illustrated a preferred system for controlling the position of the nozzle pintle 14 of FIG. 1 as a function of variations in pressure in the combustion chamber 26 of the rocket motor. In this figure, both the pintle 14 and its actuator 16 are shown in block form, as well as the rocket motor combustion chamber 26. The illustrated system incorporates the electrohydraulic servo valve 20 of FIG. 1, the action of which is regulated by a plurality of feedback loops. In one of these loops, pressure in the rocket combustion chamber 26 is sensed by transducer 28 which develop an output voltage representative thereof. This voltage is compared at a summing junction 52 with the input "command" signal 30 the value of which may be constant or may vary in accordance with any particular rocket operating sequence desired. Such sequence may for example be pre-programmed to embrace boost-sustain transition operation, thrust modulation, and multiple on-off time periods. The signal from the summing junction 52 is applied through a driver amplifier 54 to a further summing junctin 56 where it is combined with an additional signal representative of the instantaneous position of the pintle 14. The characteristics of the latter signal will be described hereinafter. From summing junction 56 the error signal is applied to the servo valve 20 in FIG. 1 through a servo amplifier 58. The voltage gain of the latter determines the static load "stiffness" of the system. It is a feature of the feedback loop 29 which includes the transducer 28 that continuous compensation is provided for errors in combustion chamber pressure due to erosion of the variable-area nozzle pintle and cowl. This erosion factor is represented by the symbol $A_e$ in FIG. 2 and is introduced into the system at the point shown.

An additional feedback loop is employed in the system of FIG. 2 to yield a signal indicative of the instantaneous position of the pintle 14 and thereby prevent it from "overshooting". This signal also precludes the pintle actuator 16 from "bottoming". It is derived from a position feedback transducer in the form of a linear variable differential transformer 60 having the mechanical connection 24 to the pintle actuator 16 as illustrated in FIG. 2. It preferably has a linear range of approximately ±0.8 inch, and incorporates a modulator/demodulator in a manner known in the art. An overall gain for the unit 60 of 2 volts/in. has been found to be adequate. During movement of the pintle, a signal $X_f$ representing the pintle position feedback voltage is supplied to the junction 52 and summed 180° out-of-phase with the input "command" signal $V_r$. This results in a deceleration of pintle movement, and consequently the amount of pintle "overshoot" from the final steady-state position is controllably minimized.

The pressure error signal resulting from a comparison of the input "command" signal $V_r$ with the output of pressure transducer 50 is fed to the driver amplifier 54 which supplies the pintle position command signal to the servo valve 20. It will be seen that the gain of the driver amplifier 54 sets the amount of chamber pressure steady-state error.

Static load "stiffness" is provided by the pintle position error signal $X_f$ present at the summing junction 56. This signal is amplified by the unit 58 and is employed to drive the torque motor included in the servo valve assembly 20. The latter regulates the flow of pressurized hydraulic fluid from the supply source 18 to the actuator 16 which in turn integrates the flow and positions the pintle 14.

Although the described control system is not prone to excessive oscillation even under severe operating conditions, it may be desirable in some cases to incorporate therein an integrator-amplifier 64 connected in parallel with the driver amplifier 54 as shown in FIG. 2. It has been found in practice that the presence of the integrator-amplifier 64 is effective to decrease the chamber pressure steady-state error substantially to zero.

Figure 3:
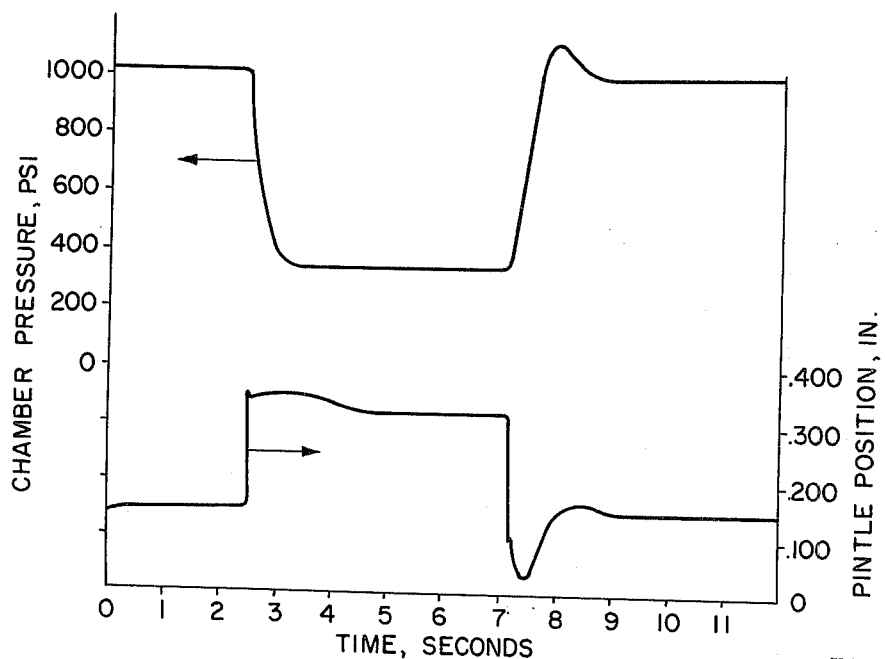
FIG. 3 is a chart illustrating the transient response of the nozzle pintle of FIG. 1 upon a variation in combustion chamber pressure, plotted on a time scale.

In FIG. 3 is illustrated a representative relationship between chamber pressure and pintle position plotted as a function of time. It will be noted that under such representative conditions pintle movement in response to a sudden decrease in chamber pressure is rapid, and that a subsequent increase in chamber pressure causes only a minor amount of pintle "overshoot" prior to its resumption of a steady-state position.

Although not illustrated and not an essential feature of the present concept, it may be desirable for certain rocket designs to incorporate one or more pressure switches and a delay relay into the arrangement of FIG. 2 in order to perform the function of making and breaking the feedback loops. When these optional elements are present, only the position feedback loop would be connected to the summing junction 56 prior to ignition and during boost phase operation when chamber pressure is high. The nozzle pintle would be held in a predetermined fixed position by the hydraulic actuator and the position feedback voltage $X_f$. During this initial phase of rocket operation, a time-delay relay in series with two pressure switches and their associated relays (one of which is set, for example, at 100 psi and the other of which is set, for example, at 1200 psi) would break the pressure feedback loop and that through the integrator-amplifier 64. The function of the time delay and the 100 psi switch is to prevent pintle actuation as a result of ignition transients. The 1200 psi switch opens the pressure loop during boost operation when chamber pressure may reach 2000 psi. During the change from boost to sustain operation both feedback loops are closed at 1200 psi. Consequently, the disclosed system is only on chamber pressure control between 100 psi and 1200 psi.

It may also be desirable to include a pressure switch (not shown) which is set at 2400 psi as a fail-safe. If this pressure is exceeded, the pressure feedback loop is broken, and a hard-over command is given to the servo valve 20 to move the pintle 14 to a wide-open throat position.

Obviously many modifications and variations of the present invention are possible in the light of the above teachings. It is therefore to be understood that within the scope of the appended claims the invention may be practiced otherwise than as specifically described.

We claim:

1. In a missile having a motor with an exhaust nozzle the throat area of which is controllably variable to correspondingly vary the thrust developed by said motor, the combination of:

means for sensing sequential changes in pressure within said motor and developing an electrical output signal representative of such pressure changes;

a source of an input command signal representative of desired pressure changes within said motor over a given period of time;

means for comparing the input command signal from said source with the signal output of said sensing means to develop an error signal;

control means, including a movable pintle and an electrically-controlled hydraulically-pressurized servo valve connected thereto, for varying the throat area of said nozzle;

means for moving said pintle as a function of changes in the amplitude of said error signal to thereby regulate the operation of said control means;

said error signal being applied to said servo valve to regulate the amount of hydraulic pressure applied to said pintle and hence the instantaneous position of the latter;

means for sensing the instantaneous position of said pintle and for developing an electrical variation representative thereof, and means for applying the electrical variation representative of the instantaneous position of said pintle to said control means to decelerate movement of the pintle during a period of rapid changes in pressure within said motor.

2. The combination of claim 1 in which the electrical variation representative of the instantaneous position of the pintle is combined 180° out of phase with the input command signal from said source prior to application to said control means.

* * * * *